US009338318B2

(12) United States Patent
Tanaka

(10) Patent No.: US 9,338,318 B2
(45) Date of Patent: May 10, 2016

(54) IMAGE READING APPARATUS

(71) Applicant: KYOCERA Document Solutions Inc., Osaka-shi, Osaka (JP)

(72) Inventor: Kunihiko Tanaka, Osaka (JP)

(73) Assignee: KYOCERA DOCUMENT SOLUTIONS INC., Osaks-Shi, Osaka (JP)

( * ) Notice: Subject to any disclaimer, the term of this patent is extended or adjusted under 35 U.S.C. 154(b) by 0 days.

(21) Appl. No.: 14/693,887

(22) Filed: Apr. 23, 2015

(65) Prior Publication Data
US 2015/0312430 A1 Oct. 29, 2015

(30) Foreign Application Priority Data
Apr. 24, 2014 (JP) ................................. 2014-089724

(51) Int. Cl.
H04N 1/04 (2006.01)
H04N 1/00 (2006.01)

(52) U.S. Cl.
CPC ................................ *H04N 1/00692* (2013.01)

(58) Field of Classification Search
CPC ................................................ H04N 1/00692
USPC .................................. 358/465, 474, 498, 497
See application file for complete search history.

(56) References Cited

U.S. PATENT DOCUMENTS

| 8,587,835 | B2 | 11/2013 | Sato | |
|---|---|---|---|---|
| 2012/0206776 | A1* | 8/2012 | Sato | H04N 1/00803 358/465 |
| 2014/0036320 | A1* | 2/2014 | Tanaka | H04N 1/40062 358/465 |

FOREIGN PATENT DOCUMENTS

| JP | 2002165054 A | 6/2002 |
|---|---|---|
| JP | 2006279094 A | 10/2006 |
| JP | 2007251691 A | 9/2007 |
| JP | 2008219808 A | 9/2008 |
| JP | 2012169755 A | 9/2012 |

* cited by examiner

*Primary Examiner* — Houshang Safaipour

(57) ABSTRACT

This image reading apparatus includes an image reading unit, an average-density calculation unit, a statistical processing unit, and a blank-page determination unit. The image reading unit reads an original image and outputs image data of the original image. The average-density calculation unit calculates an average density value of block image data for a plurality of block images, which are obtained by dividing the original image, based on the image data output from the image reading unit. The statistical processing unit determines a characteristic value of the average density value distribution associated with the block images. The blank-page determination unit determines whether or not the original image is a blank image based on the characteristic value determined by the statistical processing unit.

5 Claims, 5 Drawing Sheets

IMAGE READING APPARATUS

INCORPORATION BY REFERENCE

The disclosure of Japanese Patent Application No. 2014-89724 filed on Apr. 24, 2014 including the specification, drawings and abstract is incorporated herein by reference in its entirety.

BACKGROUND

This disclosure relates to an image reading apparatus.

Multifunction peripherals (MFP) becoming prevalent in recent years can read an image of an original document by scanning the original document with its scanner to generate image data of the original image, and then can output the original image onto a sheet of paper based on the image data, send the image data in a data file to personal computers, and send the image data via fax.

Especially, multifunction peripherals equipped with an auto document feeder (ADF) can deal with a plurality of sheets of an original document at one time. However, the original document may include blank sheets that a user does not want to copy or transmit, and therefore, in a case where a large number of original document sheets are processed through the ADF, the user takes a lot of time and effort to check for the absence of the blank sheets.

There have been proposed various techniques to detect such blank pages in original documents.

An image forming apparatus reads original documents to obtain the image data with pixel information, counts only pixels within a predetermined density range in the obtained image data, and compares the number of the pixels with a threshold value to detect blank pages in the original documents.

Another image processing apparatus detects blank pages in original documents by acquiring color occurrence frequency information about colors of all the pixels in the image data (histogram).

Furthermore, there are existing techniques for detecting blank pages in original documents that are made of colored paper or recycled paper with a low whiteness level shown as follows: (1) the first technique including determining whether original documents are made of colored paper or white paper, and in the case of colored paper, detecting blank pages by setting a threshold value, which is used to determine the presence or absence of pixels having a density, higher than the threshold value in the case of white paper; (2) the second technique including detecting blank pages based on variations in the number of black pixels within continuous lines; and (3) the third technique including detecting blank pages based on the number of pixels having a density per unit area between a margin area and a printed area.

SUMMARY

In an aspect of the present disclosure, the image reading apparatus includes an image reading unit, an average-density calculation unit, a statistical processing unit, and a blank-page determination unit. The image reading unit reads an original image and outputs image data of the original image. The average-density calculation unit calculates an average density value of block image data for a plurality of block images based on the image data output from the image reading unit. The block images are obtained by dividing the original image. The statistical processing unit determines a characteristic value of distributions of the average density values associated with the block images. The blank-page determination unit determines whether or not the original image is a blank image based on the characteristic value determined by the statistical processing unit.

DETAILED DESCRIPTION

With reference to the accompanying drawings, an embodiment of the present disclosure will be described below.

Figure 1:
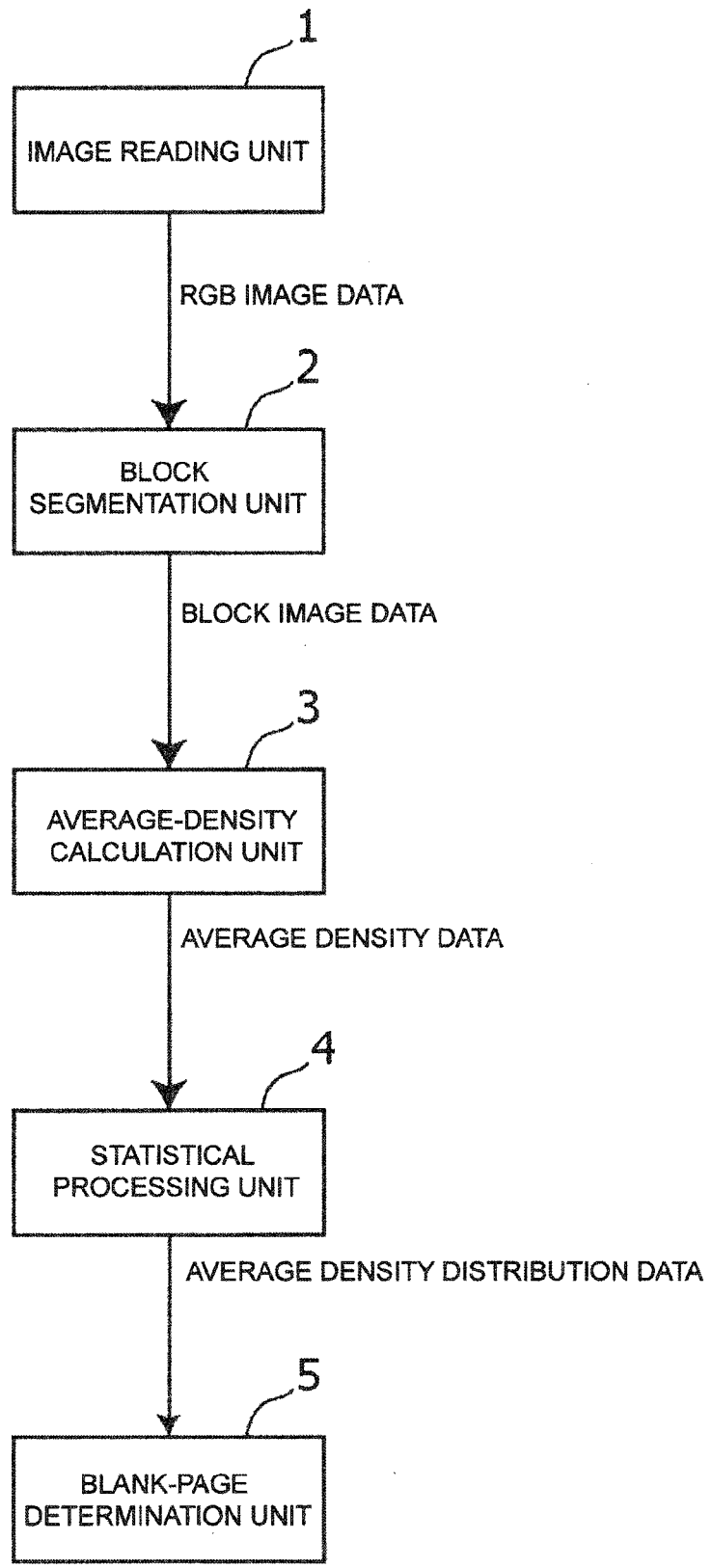
FIG. 1 is a block diagram showing the configuration of an image reading apparatus according to an embodiment of the disclosure.

FIG. 1 is a block diagram showing the configuration of an image reading apparatus according to the embodiment of the present disclosure. The image reading apparatus shown in FIG. 1 includes an image reading unit 1, a block segmentation unit 2, an average-density calculation unit 3, a statistical processing unit 4, and a blank-page determination unit 5.

The image reading unit 1 optically reads an original image and outputs image data of the original image. The image data is color image data or more specifically RGB data, but can be CMY data. Alternatively, the image data may be monochrome image data.

The block segmentation unit 2 divides the original image into a plurality of block images of the same size (e.g., a block of 50 pixels by 50 pixels or 100 pixels by 100 pixels) based on the image data of the original image of a page output from the image reading unit 1, and generates block image data for the respective block images from the image data of the original image.

The average-density calculation unit 3 calculates the average density values of the block image data. More specifically, the average-density calculation unit 3 calculates an average density value by averaging pixel values of pixels contained in a block image, and performs the calculation for every block image.

The statistical processing unit 4 determines a characteristic value of distributions of the average density values associated with all the block images in the original image of a page. The blank-page determination unit 5 determines whether or not the original image is a blank image (i.e., a blank image without an object (foreground)) based on the characteristic value determined by the statistical processing unit 4.

Specifically, the statistical processing unit 4 in this embodiment classifies the average density values into a plurality of continuous bins (intervals) each having a certain width, counts the number of times the average density values occur in each bin, and determines a characteristic value of distributions of the counts in the plurality of bins or the frequencies based on the counts (so-called histogram distributions).

Figure 2:
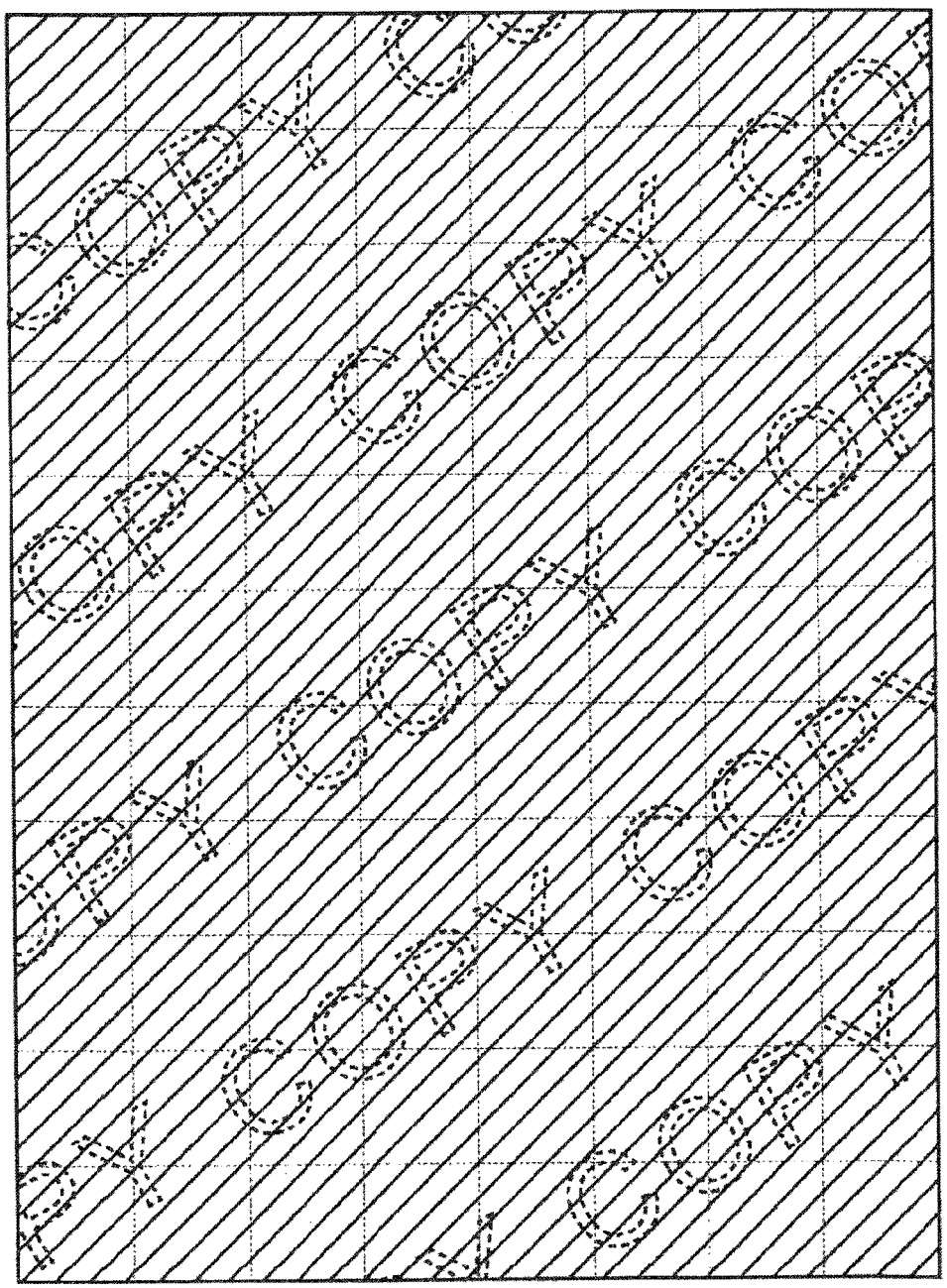
FIG. 2 illustrates an example of an original image with only a latent background pattern and the block images.
Figure 3:
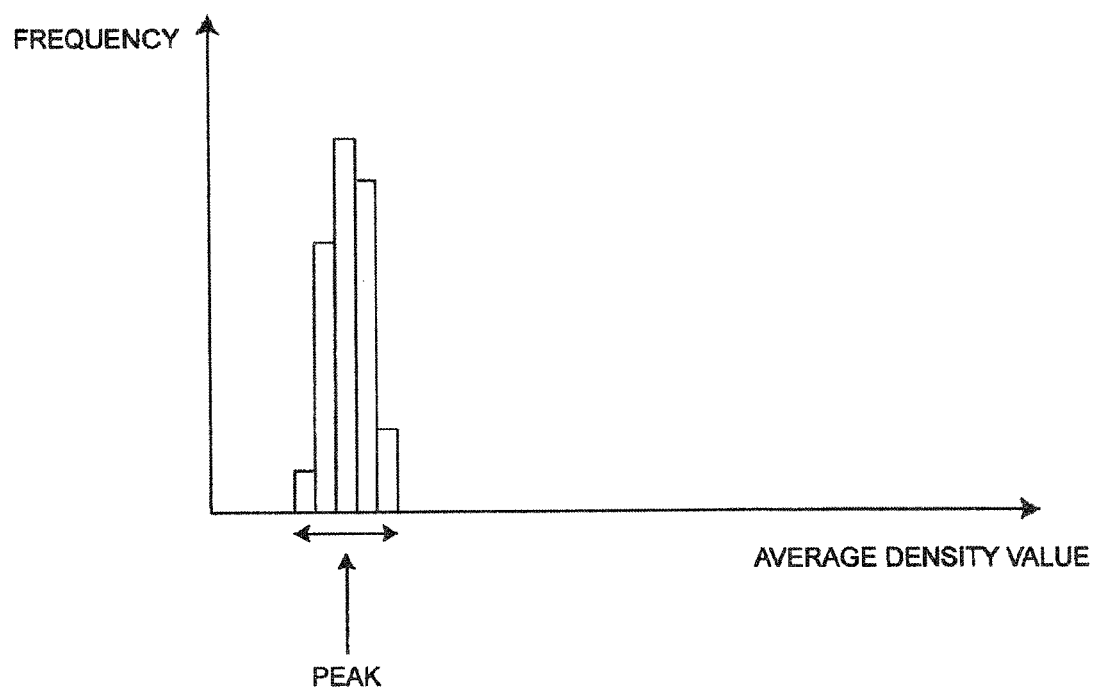
FIG. 3 shows an example of a histogram representing the average density value distribution of block image data of the original image with only the latent background pattern.

FIG. 2 illustrates an example of an original image with only a latent background pattern and the block images. The latent background pattern on the original image shown in FIG. 2 represents warning text strings "COPY". FIG. 3 illustrates an example of a histogram representing the distribution of the average density values of the block image data composing the original image with only the latent background pattern (i.e., a graph showing the counts and the frequencies in the respective bins).

In a case where the original image has only the latent background pattern as shown in FIG. 2 but not an object, the average density values of block images including (part of) latent image portions are lower than the average density values of block images not including any latent image portions in accordance with the size of the latent image portions included in the block images. However, the average density values are confined within narrow limits as shown in FIG. 3 because there is almost no visible difference in density between the latent image portions and background portion.

Figure 4:
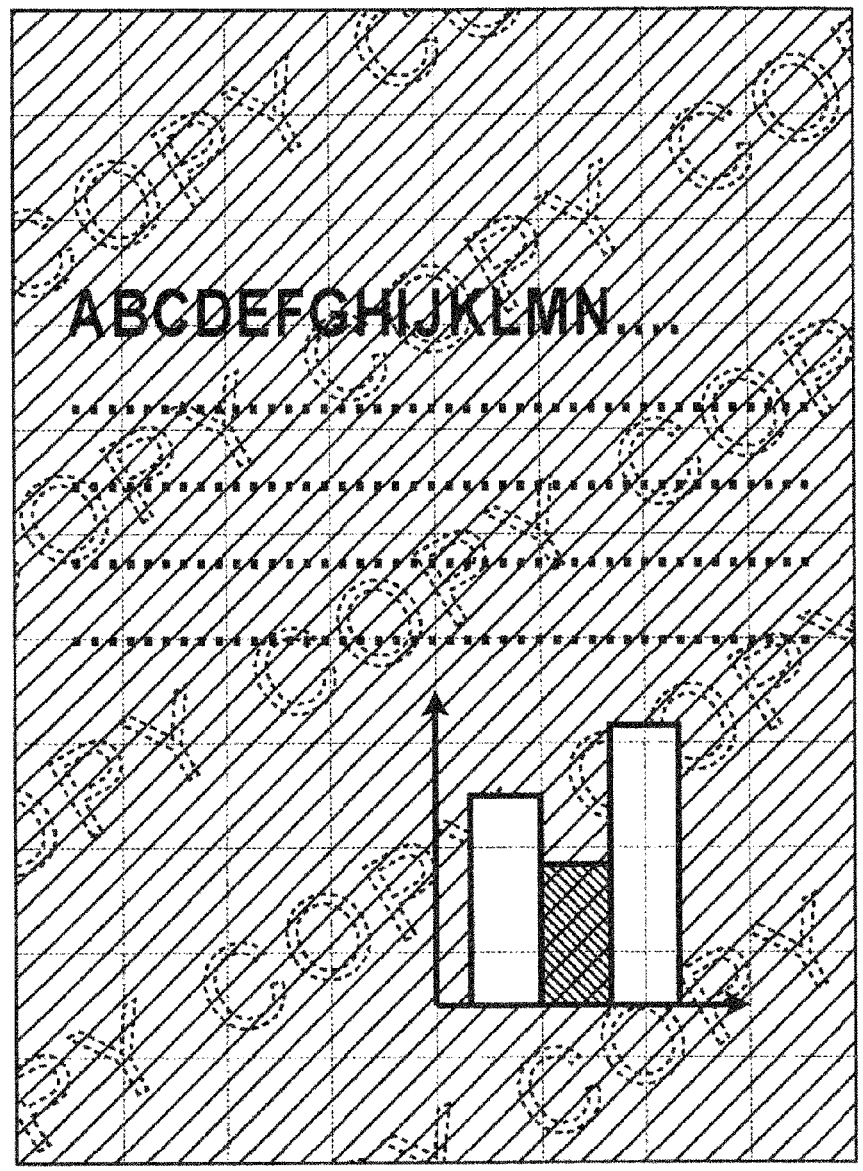
FIG. 4 illustrates an example of an original image with a latent background pattern and objects (foreground) and the block images.
Figure 5:
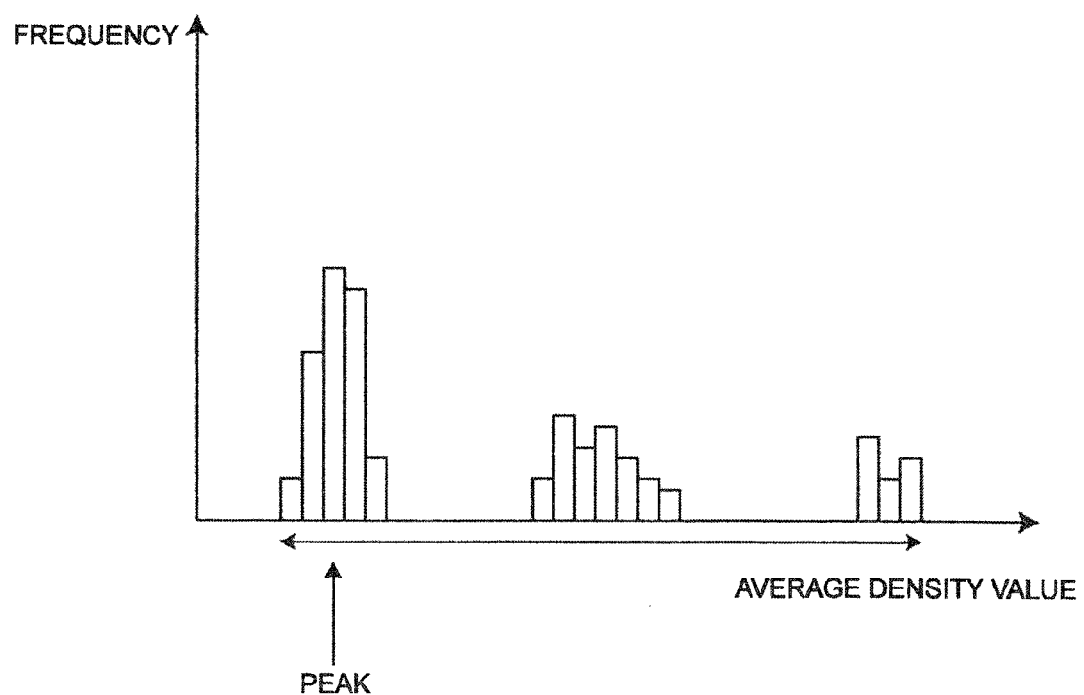
FIG. 5 shows an example of a histogram representing the average density value distributions of block image data of the original image with the latent background pattern and objects (foreground).

FIG. 4 illustrates an example of an original image with a latent background pattern and objects (foreground) and the block images. The latent background pattern on the original image shown in FIG. 4 represents warning text strings "COPY". FIG. 5 illustrates an example of a histogram representing the distributions of the average density values of the block image data composing the original image with the latent background pattern and objects (foreground).

In a case where the original image has the latent background pattern and objects (characters and a figure in this embodiment) as shown in FIG. 4, the densities of the objects are higher than the densities of the background (i.e., the latent image portions and background portion), and therefore, as shown in FIG. 5, distributions associated with the block images not including the objects are plotted toward the higher average density values apart from the distribution associated with the background (latent image portions and background portion) with low average density values. In addition, since the number of the block images containing only background (i.e., latent image portions and background portion) is decreased with an increase in number of the block images containing objects, the counts or frequencies in the bins corresponding to the peak of the distributions are decreased as shown in FIG. 5.

Thus, the statistical processing unit 4 identifies, for example, the maximum value of the counts or frequencies for the plurality of bins as the aforementioned characteristic value. As shown in FIG. 5, the original image containing objects has a lower number of counts or frequencies in the bins corresponding to the peak of the distributions (i.e., the maximum value of the counts or frequencies in the plurality of bins). If the characteristic value is lower than a predetermined threshold value, it is determined that the original image is not a blank image, while if the characteristic value is equal to or higher than the predetermined threshold value, it is determined that the original image is a blank image.

In addition, for example, the statistical processing unit 4 identifies a density difference between the bin with the minimum average density value and the bin with the maximum average density value among bins that have a count or frequency equal to or higher than a predetermined threshold value, or a density difference between the minimum and maximum average density values, as the aforementioned characteristic value. Since the average density values of the original image containing the objects are distributed widely, for example, as shown in FIG. 5, the original image containing the objects is determined as not being a blank image if the characteristic value is equal to or higher than a predetermined threshold value, while the original image is determined as being a blank image if the characteristic value is lower than the threshold value.

In a case where image data output from the image reading unit 1 is color image data, the block segmentation unit 2, average-density calculation unit 3, statistical processing unit 4, and blank-page determination unit 5 perform the above-described processes on respective color components of the color image data (e.g., R component, G component, and B component, if the color image data is RGB data). The blank-page determination unit 5 determines that the original image is a blank image after the characteristic values of all the color components of the image data indicate that the original image is a blank image. If the characteristic value of even one color component does not indicate that the original image is a blank image, the blank-page determination unit 5 determines that the original image is not a blank image.

The block segmentation unit 2, average-density calculation unit 3, statistical processing unit 4, and blank-page determination unit 5 are implemented, for example, by executing a program in a computer including a central processing unit (CPU), read only memory (ROM), random access memory (RAM) and other components, or implemented with an application specific integrated circuit (ASIC).

Next, the operation of the image reading apparatus will be described.

The image reading unit 1 optically reads an original image and outputs image data of the original image of a page. The image data of the original image is temporarily stored in, for example, a memory.

The block segmentation unit 2 extracts every piece of block image data from the image data of the original image, and then the average-density calculation unit 3 calculates the average density values for the block image data and temporarily stores the calculated average density values as average density data in, for example, a memory.

The statistical processing unit 4 retrieves the average density values of the block image data associated with all the block images composing the original image of a page, determines the characteristic value of the average density value distributions, and temporarily stores the characteristic value as average density distribution data in, for example, a memory.

Then, the blank-page determination unit 5 determines whether or not the original image is a blank image based on the characteristic value determined by the statistical processing unit 4.

According to the embodiment as described above, the image reading unit 1 reads an original image and outputs image data of the original image. The average-density calculation unit 3 calculates average density values of block image data for a plurality of block images, which are obtained by dividing the original image, based on the image data output from the image reading unit 1, and the statistical processing unit 4 determines a characteristic value of distributions of the average density values associated with the plurality of block images. Then, the blank-page determination unit 5 determines whether or not the original image is a blank image based on the characteristic value determined by the statistical processing unit 4.

Since it is determined whether or not the original image is a blank image based on the distributions of the average density values of the block images, the determination is less affected by the difference between the latent image portions and background portion on the background. Therefore, blank pages can be detected with high accuracy from original documents having a latent background pattern.

Although the foregoing embodiment is a preferred example of the present disclosure, it is to be noted that the present disclosure is not limited by the embodiment, and that various modifications and changes can be made without departing from the spirit of the present disclosure.

For example, the characteristic value to be determined by the statistical processing unit 4 can be a standard deviation or dispersion of the average density values based on the average density value distribution in the above-described embodiment. In this case, since the average density values of the original image containing objects are distributed widely, for example, as shown in FIG. 5, the original image containing the objects is determined as not being a blank image if the characteristic value is equal to or higher than a predetermined threshold value, while the original image is determined as being a blank image if the characteristic value is lower than the threshold value.

The present disclosure is applicable to, for example, detection of blank pages in original documents.

What is claimed is:

1. An image reading apparatus comprising:
    an image reading unit that reads an original image and outputs image data of the original image;
    an average-density calculation unit that calculates an average density value of block image data for a plurality of block images based on the image data output by the image reading unit, the block images being obtained by dividing the original image;
    a statistical processing unit that determines a characteristic value of distributions of the average density values associated with the block images; and
    a blank-page determination unit that determines whether or not the original image is a blank image based on the characteristic value determined by the statistical processing unit.

2. The image reading apparatus according to claim 1, wherein
    the statistical processing unit classifies the average density values into a plurality of continuous bins each having a certain width, counts the number of times the average density values occur in each bin, and determines a characteristic value of distributions of the counts in the plurality of bins or the frequencies based on the counts, and
    the blank-page determination unit determines whether or not the original image is a blank image based on the characteristic value determined by the statistical processing unit.

3. The image reading apparatus according to claim 2, wherein
    the statistical processing unit identifies the maximum value of the counts or frequencies in the plurality of bins as the characteristic value.

4. The image reading apparatus according to claim 2, wherein
    the statistical processing unit identifies a density difference between the bin with the minimum average density value and the bin with the maximum average density value among bins that have a count or frequency equal to or higher than a predetermined threshold value, or a density difference between the minimum and maximum average density values, as the characteristic value.

5. The image reading apparatus according to claim 1, wherein
    the statistical processing unit identifies a standard deviation or dispersion of the average density values based on the average density value distribution as the characteristic value.

* * * * *